United States Patent [19]

Yang

[11] Patent Number: 4,530,642
[45] Date of Patent: Jul. 23, 1985

[54] WINDMILL MECHANISM

[76] Inventor: Wei H. Yang, 3355 Geddes Rd., Ann Arbor, Mich. 48105

[21] Appl. No.: 552,945

[22] Filed: Nov. 17, 1983

[51] Int. Cl.³ .............................................. F03D 7/06
[52] U.S. Cl. .................................. 416/119; 416/132 B
[58] Field of Search ................ 416/240 A, 43 A, 111, 416/118–119, 132 B

[56] References Cited

U.S. PATENT DOCUMENTS

| 419,024 | 1/1890 | Straw | 416/119 |
|---|---|---|---|
| 4,066,911 | 1/1978 | Sarchet | 416/132 B X |
| 4,129,787 | 12/1978 | Palma | 416/111 X |
| 4,168,439 | 9/1979 | Palma | 416/111 X |
| 4,178,126 | 12/1979 | Weed | 416/118 X |
| 4,218,183 | 8/1980 | Dall-Winther | 416/132 B X |
| 4,303,835 | 12/1981 | Bair | 416/119 X |
| 4,365,934 | 12/1982 | Mason | 416/119 X |
| 4,410,806 | 10/1983 | Brulle | 416/119 X |
| 4,457,669 | 7/1984 | Corry | 416/132 B |

FOREIGN PATENT DOCUMENTS

| 1028626 | 3/1978 | Canada | 416/119 |
|---|---|---|---|
| 2836922 | 3/1980 | Fed. Rep. of Germany | 416/132 B |
| 2289764 | 5/1976 | France | 416/240 A |
| 2312666 | 12/1976 | France | 416/132 B |
| 2468002 | 5/1981 | France | 416/119 |
| 2479344 | 10/1981 | France | 416/119 |

Primary Examiner—Everette A. Powell, Jr.
Attorney, Agent, or Firm—Stephenson and Boller

[57] ABSTRACT

An improved windmill mechanism for adjusting the position of a wind responsive assembly in relation to wind is disclosed. The preferred embodiment comprises a fabric sail mounted on the end of an arm which extends from a power output shaft. A torque sensor is disposed on the arm to sense the torque contribution through that arm to the power output shaft in response to wind acting upon the fabric sail on that arm. The position of the fabric sail is adjusted on the arm by means of a control processor which controls a trim-motor and a magnetic brake. The control processor receives the torque signal provided from the sensor and provides adjustment of the fabric sail in accordance with the torque signal. The control operates to position the sail in a running mode over the semi-circular path segment of rotation of the arm which has a leeward component of motion. It is also effective to position the sail to tacking modes at the beginning and ending of the semi-circular path segment and the flutter mode in the middle of that segment which has a windward component of motion. The control is also effective to automatically adjust for changes in the prevailing wind direction. The sails are supported on flexible mast elements which provide automatic feathering of the sails in response to wind gusts and high wind velocities.

2 Claims, 12 Drawing Figures

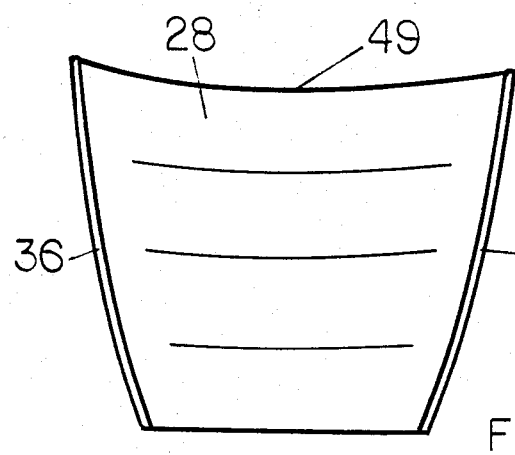
FIG. 3
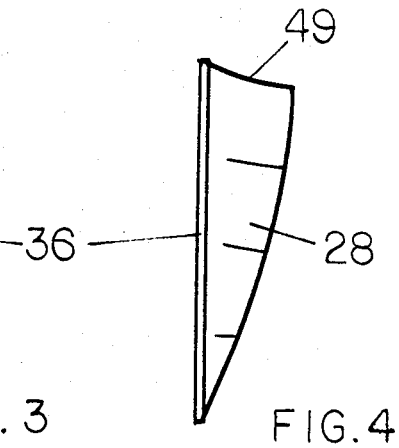
FIG. 4
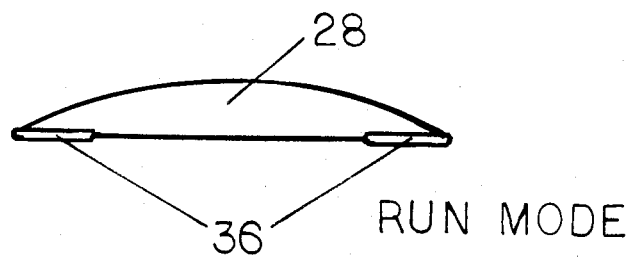
RUN MODE
FIG. 5
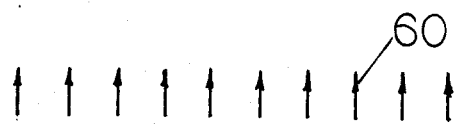
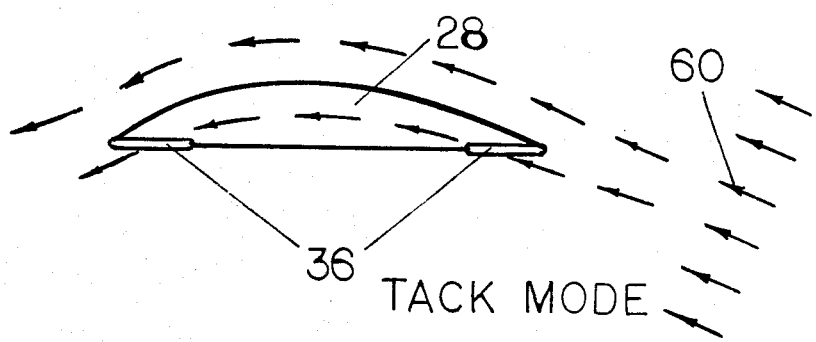
TACK MODE
FIG. 6

4,530,642

1

WINDMILL MECHANISM

BACKGROUND OF THE INVENTION

This invention relates generally to windmills and more specifically to a mechanism providing for selective positioning of a wind responsive surface on a windmill.

A preliminary novelty search conducted in connection with the present invention developed the following U.S. patents.

U.S. Pat. Nos. 3,743,848, 3,793,530, 3,902,072, 3,995,170, 4,031,405, 4,066,911, 4,184,084, 4,329,593, 4,346,506.

These patents relate to various windmills in which wind responsive surfaces are caused to assume various positions in relation to the wind as the windmill is rotated by the wind. In a vertical axis windmill, one objective is to increase efficiency of operation so that over the half revolution which has a leeward component of motion, maximum wind utilization is obtained, while over the half revolution which has a windward component of motion, resistance is minimized. Increased efficiency is especially important at relatively low wind velocities.

One example of this objective is demonstrated in U.S. Pat. No. 4,184,084 in which the wind responsive surfaces are rigid vanes. As a vane travels along the semi-circular segment of motion which has a windward component, it aligns with the wind so as to continuously present minimum wind resistance over that half revolution of travel. As a vane travels over the semi-circular segment of motion which has a leeward component. It is constrained against rotation so that it always captures at least some of the wind.

U.S. Pat. No. 3,995,170 discloses a windmill which is allegedly able to take advantage of the wind over slightly more than 180° of one complete revolution (360°).

The present invention relates to an improved windmill mechanism for adjusting the position of a wind responsive surface in relation to wind to obtain greater efficiency. It employs large sails and the sailing principle. When travelling on a circular path, a sail can take advantage of the wind over more than 300° of a revolution. This construction and arrangement make the windmill very efficient especially in low wind speeds. As noted above, improved efficiency is important, particularly for low wind speed operation.

In addition to the improved efficiency of operation which is obtained with the present invention, a further improvement is obtained by virtue of the construction and arrangement of the wind responsive surfaces and their supports. Specifically the wind responsive surfaces and their supports, in their preferred form, are constructed and arranged so as to automatically compensate for higher wind speeds by automatic feathering. This renders them less prone to damage in response to sudden wind gusts and high wind speeds, and it also means that their mass can be kept lower than might otherwise be the case. By minimizing mass, improved control is obtained. This further increases the efficiency of operation.

SUMMARY OF THE INVENTION

In a preferred embodiment of the invention which is disclosed herein, a sail is disposed on the end of an arm which extends radially from a power output shaft. Wind causes the sail and arm to rotate about the axis of the power output shaft thereby powering said shaft. The sail is supported on the arm by a mast structure which is itself journaled for rotation on the arm about an axis parallel to the axis of the power output shaft to thereby mount the sail for rotation on the arm. A torque sensor is disposed on the arm to sense the torque which is delivered via the arm to the output shaft in response to wind acting on the sail. The torque sensor delivers a signal representing torque to a control processor which acts upon the signal to position the mast structure, and hence the sail, with respect to the arm. The control processor performs the positioning of the sail through a trim-motor and a magnetic brake. The control processor is so configured as to cause the sail to assume an orientation which runs with the wind as the sail traverses the semi-circular segment of its path of the motion which is in the leeward direction. It is also effective to cause the sail to assume tacking modes of operation at the beginning and ending of the semi-circular segment of motion which is in the windward direction.

The preferred disclosed construction for the sail and mast structure comprises a fabric sail supported along a base edge on the mast base and along two side edges on resiliently flexible mast elements extending uprightly from the mast base. The mast elements flex in response to increasing wind speeds to alleviate the potential for damage which might be caused by sudden wind gusts or at high wind velocities, and provides automatic feathering.

The power output shaft of the windmill rotates to produce output power for utilization by any desired utilization device such as a generator, air-compressor, pump, or by some combination of several above devices simultaneously.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 3 is an enlarged view of a wind responsive assembly looking in the same direction as the view of FIG. 1.

FIG. 4 is a side elevational view of FIG. 3.

FIG. 5 is a top view of FIG. 3 illustrating one operational mode.

FIG. 6 is a top view of FIG. 3 illustrating another operational mode.

DESCRIPTION OF THE PREFERRED EMBODIMENT

Figure 1:
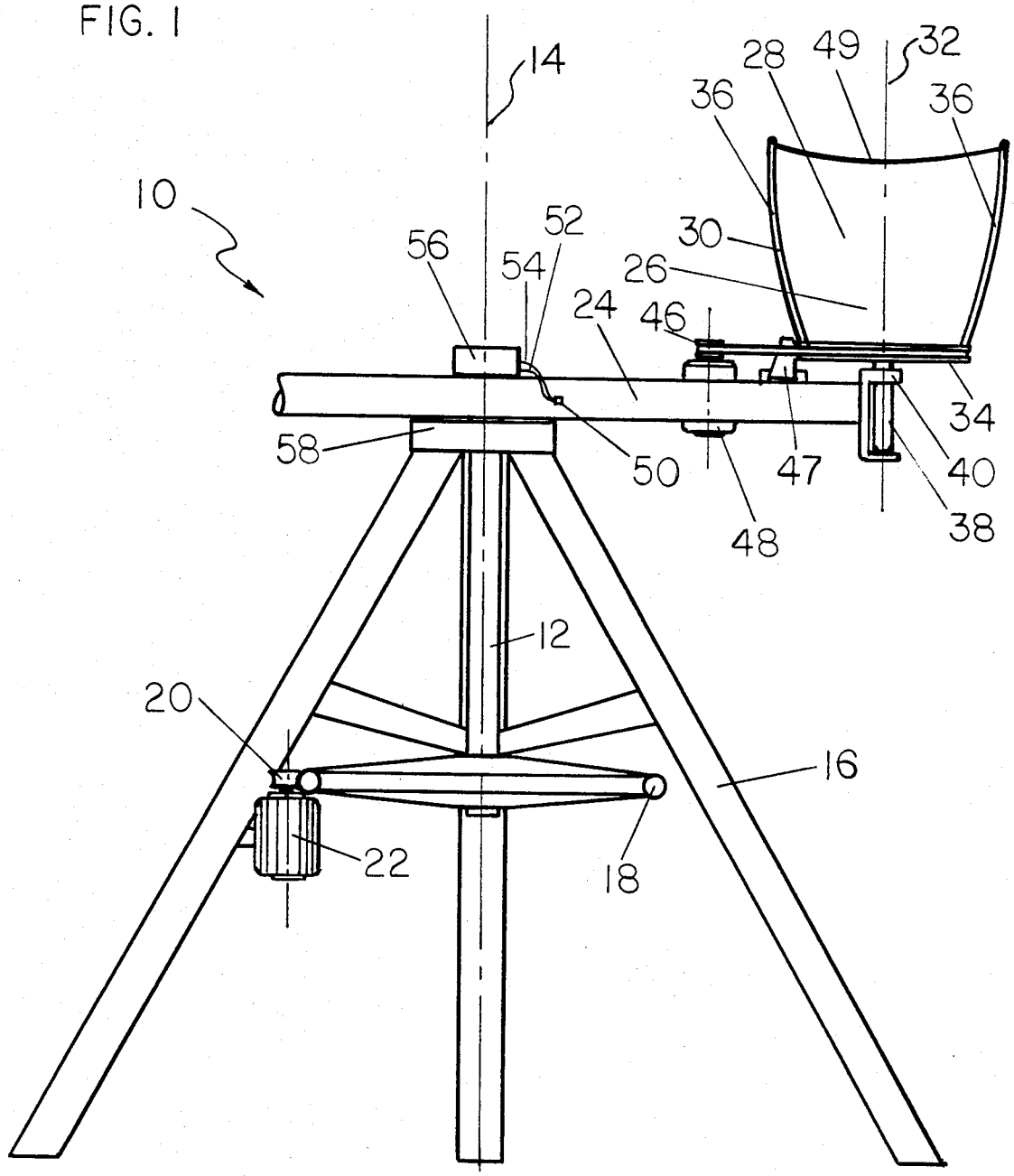
FIG. 1 is a front elevational view of a windmill mechanism embodying principles of the present invention.
Figure 2:
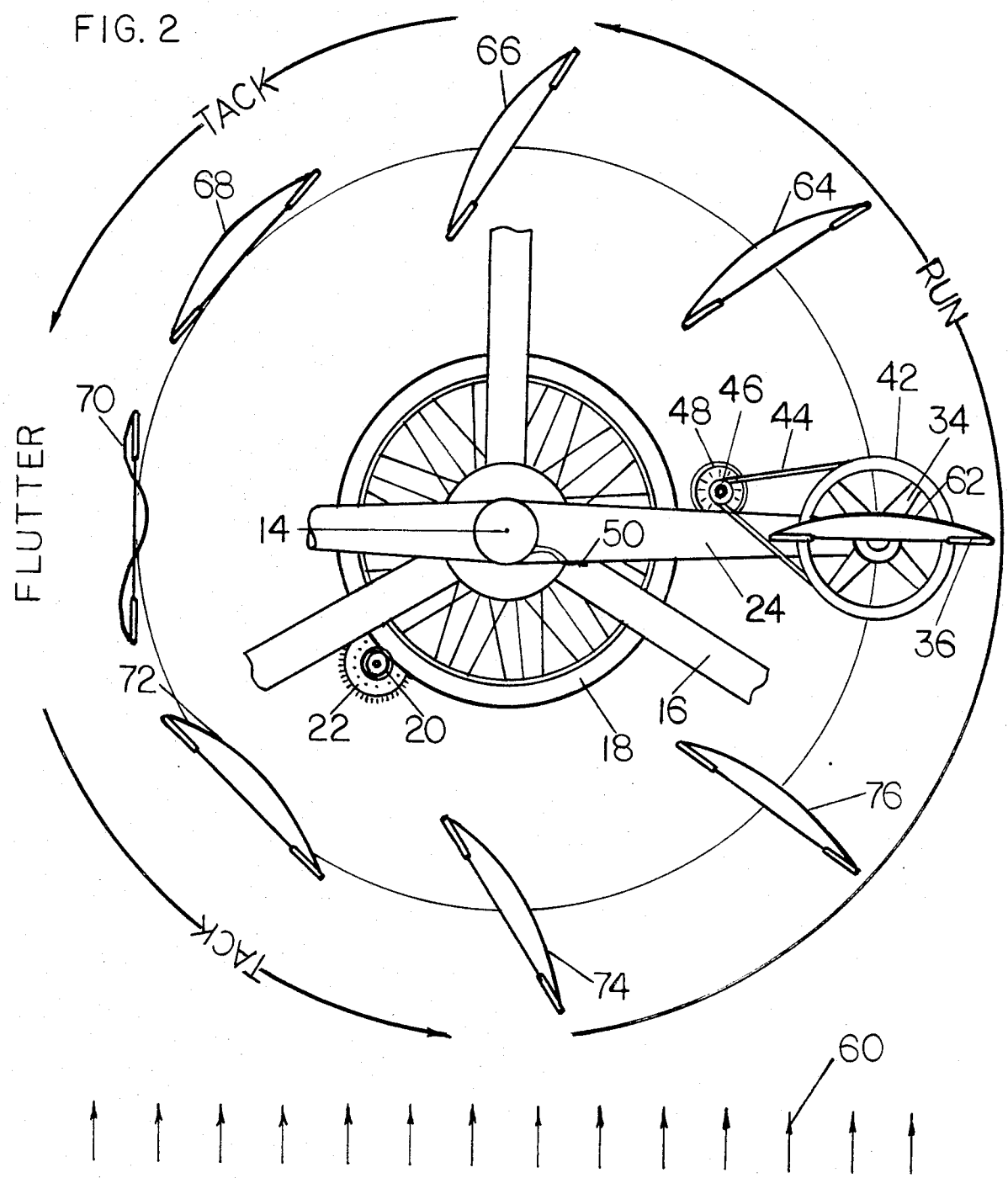
FIG. 2 is a top plan view of FIG. 1 and further illustrating various operating positions for one portion of the windmill mechanism.

FIG. 1 and 2 illustrate a windmill mechanism 10 embodying principles of the present invention. The illustrated embodiment is of a vertical axis windmil having an output shaft 12 disposed along a vertical axis 14.

Shaft 12 is journaled for rotation about axis 14 by a suitable frame structure. The illustrated embodiment utilizes a tripod stand structure 16 for the frame. The weight of the frame structure may be sufficient by itself to provide stability, or alternatively the individual legs of the tripod stand may be anchored or otherwise secured to a support surface such as the ground or a roof top.

A spoked drive wheel 18 is disposed on the lower end of the shaft 12 and the perimeter of the drive wheel 18 frictionally, or by other power transmission method, engages an input wheel 20 on a utilization device 22 such as a generator, air-compressor, water pump or the like. As shaft 12 is rotated about axis 14, the utilization device 22 is thereby powered. The manner in which shaft 12 is itself powered will now be explained.

One or more radially extending arms 24 are affixed to shaft 12. The illustrated embodiment shows only one such arm for purposes of clarity and explanation. It will be appreciated that more than one arm may be used, and the arms circumferentially arranged at intervals, preferably regular ones, about the shaft 12.

A wind responsive assembly 26 is supported on arm 24 in radially outwardly spaced relationship from axis 14. In the illustrated embodiment, this wind responsive assembly comprises a fabric sail 28 supported on a mast structure 30. Mast structure 30 is journaled on arm 24 for rotation about an axis 32 which is parallel to axis 14.

Mast structure 30 comprises a light weight rotating base 34, uprights 36, and a journal shaft 38. Base 34 is disposed at a level just above arm 24, and journal shaft 38 depends vertically from the center of base 34 to be journaled by bushings, bearings or other similar journaling structure 40 on the end of arm 24.

As can be seen in FIG. 2, base 34 is in the form of a spoked wheel and is provided with a circumferential groove 42. An endless belt 44 fits within groove 42 to operatively couple base 34 with a sheave 46 on the shaft of a trim-motor 48. Trim-motor 48 is suitably mounted on arm 24 at a location spaced radially inwardly from shaft 38. Trim-motor 4B is operable via belt 44. A magnetic brake 47 is disposed on the arm 24 near the edge of base 34. The trim-motor 48 together with the magnetic brake 47 are controlled, in a manner to be explained later on, to selectively position base 34, and hence the mast and sail structure, about axis 32 on the end of arm 24.

Figure 7:
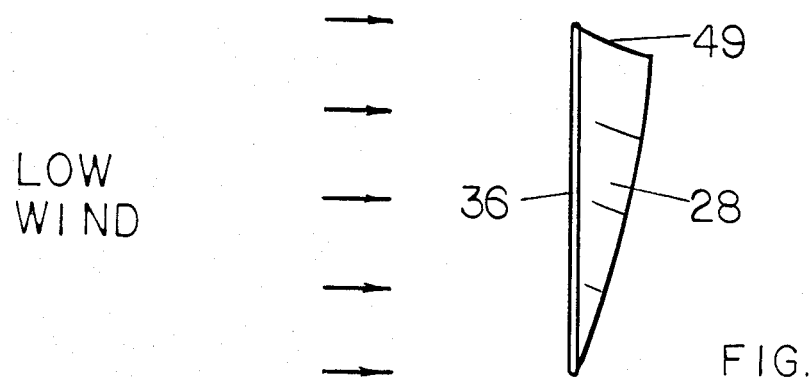
FIG. 7 is a side elevational view similar to the view of FIG. 4 illustrating one operating condition.
Figure 8:
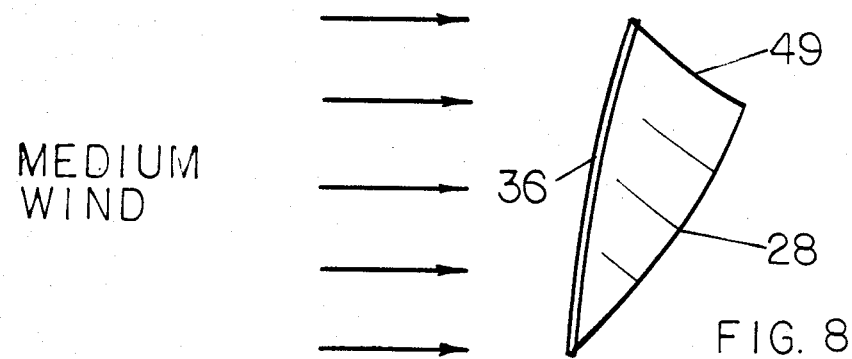
FIG. 8 is a view similar to FIG. 7 illustrating a second operating condition.
Figure 9:
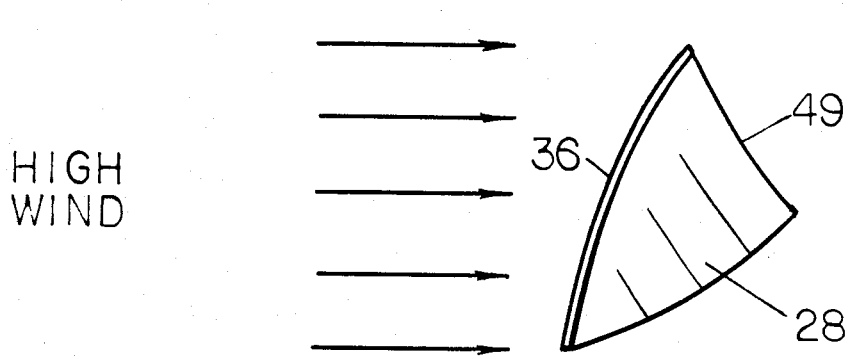
FIG. 9 is a view similar to FIG. 7 and 8 illustrating a third operating condition.

The upright mast elements 36 are disposed diametrically opposite each other on base 34, and they extend generally upwardly but diverge outwardly in an arcuate manner. Referring additionally to FIGS. 7, 8 and 9, one will observe that the mast elements are of a material which endows them with a certain flexibility in response to increasing side forces. Such increasing side forces may be developed in response to increasing winds acting upon fabric sail 28. It ,will also be noted in the drawing FIGS. 7, 8 and 9 that increasing wind is effective to flex the mast elements both in the leeward direction and closer toward each other. This results in the fabric sail assuming positions such as illustrated in FIGS. 8 and 9 at increasing wind velocities and constitutes an automatic feathering action. The automatic feathering action is facilitated by tailoring the upper edge 49 of the fabric sail to a concave shape as can be seen in FIG. 3. As the wind velocity increases and the mast elements increasingly flex toward each other and leewardly, a progressively decreasing effective area of the sail is presented to the wind. This feature is beneficial for protecting the sail and mast structures from potential damage in response to sudden increases in wind velocities and high winds. Also, it means that the construction does not need to have extra strength and weight of materials to withstand increased wind load without breaking. The light weight design of the wind responsive assembly 26 enables near instantaneous control to optimally position the sail for maximum torque on the power output shaft 12. The windmill is safe at high wind velocities and is efficient at all wind velocities especially at low wind velocities.

It will be appreciated that where more than one arm 24 and wind responsive assembly 26 are used, there will be a similar construction for each wind responsive assembly including the components associated with the trimming action for the wind responsive assembly.

A torque sensor 50 is associated with arm 24. The purpose of torque sensor 50 is to provide an instantaneous measurement of the torque contribution from the associated arm 24 to output shaft 12. In other words, the torque sensor 50 shown in FIGS. 1 and 2 provides a signal indicative of the instantaneous torque being delivered by the illustrated wind responsive assembly 26 to shaft 12.

Any suitable device may be used for torque sensor 50. For example, it is possible for the torque sensor to take the form of a strain gauge which would be suitably affixed to an appropriate point of arm 24 to measure the strain at that point created in response to a moment transmitted by the arm, hence the strain signal would be representative of torque.

Torque sensor 50 is operatively associated with a control circuit for control of trim-motor 48 and magnetic brake 47. As can be seen in FIG. 1, a pair of lead wires 52 and 54 couple torque sensor 50 to a control processor 56. Control processor 56 mounted on top of shaft 12 is also effective to control other wind responsive assemblies on additional arms like 24. It is therefore a central processor. Lead wires (not shown) extend from control processor 56 to each trim-motor and magnetic brake. Because the electrical devices 47, 48, 50 and 56 are mounted on the rotating arm 24, electrical power is conducted to them from the tripod stand to the rotating arm through a slipring and brush system 58.

Control processor comprises electronic circuits constructed and arranged to sense the torque signals from the torque sensor 50, then provides controls to trim-motor 48 and magnetic brake 47 to rotate and to lock the wind responsive assembly 26. The brake is in the lock position when it is not energized and is released when the trim-motor is running. Specifically, the control processor is constructed to cause the wind responsive assembly 26 to be positioned on arm 24 in a manner corresponding to that depicted by FIG. 2 to maximize the torque on the output shaft 12 at all time.

Refering to FIG. 2, one will observe that the direction of the prevailing wind is indicated by the arrows 60, and the position of arm 24 and assembly 26 in FIG. 2 corresponds to the position shown in FIG. 1. FIG. 2 illustrates seven other positions of only the wind responsive assembly 26 by itself at succesive uniform 45° increments of rotation of arm 24. The illustrated configuration has the arm 24 rotating in the counterclockwise sense about axis 14 as viewed in FIG. 2. For convenience, the eight positions of assembly 26 will be designated as follows: reference number 62 for the three o'clock position, 64 for the 1:30 o'clock position, 66 for the twelve o'clock position, 68 for the 10:30 o'clock position, 70 for the nine o'clock position, 72 for the 7:30 o'clock position, 74 for the six o'clock position, and 76 for the 4:30 o'clock position. Since the arm rotates in the counterclockwise sense for wind direction 60, the semi-circular path segment from six o'clock to twelve o'clock has a leeward component of motion while the semi-circular path segment from twelve o'clock back to six o'clock has a windward component.

For purpose of explanation, the description will commence at the nine o'clock position indicated by reference number 70. In this position, base 34 is so adjusted on arm 24 that the two mast elements 36 are in alignment with the wind. This corresponds to a flutter position of the fabric sail which presents least wind resistance. It is to be understood that in actual practice the mechanism would not start at position 70, bacause the inertia built up in the arm 24 and assemby 26 at earlier positions is required to carry the assembly 26 through position 70, when a mechanism with only one arm 24 is used.

In the flutter positions, which corresponds to less than 60° in one revolution of arm 24, the wind responsive assembly 26 exerts a small negative torque on the output shaft 12. As the arm 24 rotates in the counterclockwise sense from 70, the relative position of wind responsive assembly 26 remains on arm 24 until tacking occurs with the sail coming to a position where the wind begins to become effective on it to produce a positive torque contribution. Tacking is an aerodynamic phenomenon where the sail acts as an airfoil as shown in FIG. 6. By appropriate operation of trim-motor 48 through control process 56, the position of the wind responsive assembly now begins to be adjusted as the arm traverses toward the six o'clock position to continue tacking. The drawing figure identifies this mode of operation as a tacking mode.

Extending from the six o'clock position 74 to the twelve o'clock position 66, the wind responsive assembly 26 operates in a run mode as shown in FIG. 5. In other words, the fabric sail is directly acted upon by the wind as it executes its leeward component of travel from the six o'clock to the twelve o'clock position. This is called running with the wind.

The illustrated construction is such that the trim-motor is continuously adjusting the sail during the run mode whereby base 34 is rotated approximately 90° in the clockwise sense on arm 24 as the arm rotates 180° counter-clockwisely from the six o'clock to the twelve o'clock position. As it passes through the three o'clock position, it is obvious that the optimal position of the wind responsive assembly 26 has the line between two mast elements perpendicular to the wind direction 60 for maximum wind gathering surface. The optimal positions of the wind responsive assembly at arm positions 64, 66, 74 and 76 are shown approximately in FIG. 2. It can be appreciated that the relative position of wind responsive assembly 26 to the arm 24 is essentially fixed as the arm travels from 4:30 o'clock to 1:30 o'clock position.

As arm 24 rotates from the twelve o'clock position back to the six o'clock position, it has a windward component of motion. From the twelve o'clock position toward the nine o'clock position, the said is adjusted to operate in a tacking mode until it flutters. During flutter mode, the sail is not adjusted until tacking resumes at a point between the nine and six o'clock positions at which point the trim-motor is effective to once again adjust the mechanism in the manner described.

From this description it can be appreciated that the fabric sail is rotated by the trim-motor only 180° for every 360° rotation of arm 24. The operation of the trim-motor is carefully controlled to produce the run and tacking modes of operation. During flutter, minimum wind resistance is presented as the sail passes between tacking modes.

The trim-motor is controlled to so adjust the position of the sail during tacking to develop a maximum positive rotational component of torque. Thus, over one revolution of arm 24 the amount of inactive travel and negative-torque-producing travel are greatly reduced comparing to the existing windmills. This contributes to an improved net energy producing ability per revolution of the present invention.

It will be appreciated that the drawing figures are intended to be representative and that in any given embodiment, the actual extent of the controls on wind responsive assembly will be dependent on a number of factors. Therefore while it may be difficult to define accurately their precise angular extent, the controls will make a significant contribution to increase torque. Like an experienced sailor trimming his sails continuously to gain maximum advantage from the wind, the control processor does it more accurately during both tacking and running modes. FIGS. 5 and 6 illustrate the aerodynamic action of the wind on the sail in the respective modes.

The control logic in the form of a computer program (soft-ware) which will be described later is extremely simple. The control continuously maximizes the signal from the sensor 50. Even in flutter positions where torgue is negative, the control will seek least negative signal from sensor 50. The same control logic works for both leeward and windward motions of the wind responsive assembly 26.

Where the mechanism comprises more than one arm and wind responsive assembly, it will be appreciated that there is a corresponding sensor 50 and control arrangement for each arm. The sensor associated with each arm will adjust the wind responsive assembly on that arm in the manner described above so that there is in effect an individual control for each arm corresponding to the control described above for the illustrated sensor and arm. In this way, each torque sensor controls the wind responsive assembly of the corresponding arm whereby at all times the wind responsive assemblies are adjusted to provide a maximum efficiency for the windmill. In other words, the adjustment of the wind responsive assembly on each arm is independent of that of any other arm.

Figure 12:
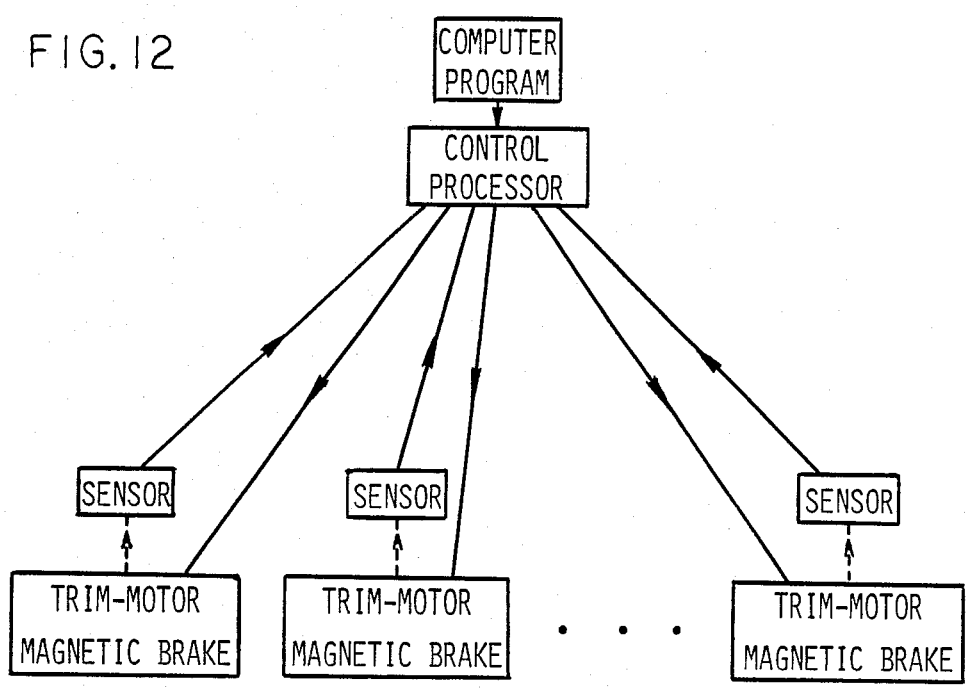
FIG. 12 is a flow diagram of the control circuit.

The control processor is designed to read signals from the sensor of each arm sequentially at a predetermined frequency. The values of the torque of a given arm at three consecutive time steps are temporarily stored in the processor memory. The first and second time derivatives of the torque, $T'$ and $T''$ respectively, are computed instantly. T' and T" contain information on the trend of the torque under general operation conditions. They are used to determine the following control logic. If T' is positive, no control is activated since the arm is already moving to increase the torque. If T' is negative, the trim-motor is activated for a length of time accurately determined by the values of T' and T" in the form of a control function F(T', T"). The extent of this control function depends on each construction and local environment. Since it is a soft-ware, a program can be written for each windmill site to best utilize local conditions. A brief flow diagram of the control circuit is shown in FIG. 12.

This approach eliminates two sided trimming since the wind responsive assembly is allowed to wait for the optimal position without control when the arm motion causes the torque to increase. After a maximum torque is reached, continuous arm rotation will decrease the torque unless appropriate trimming is provided. This will be the case and the control logic is designed to catch up with the maximum torque continuously. In the illustrated embodiment shown in FIGS. 1 and 2, the sensor is placed on one side of the arm 24 causing the arm to rotate counter-clockwisely. If desired, the sense of the arm rotation can be reversed by placing the sensor in the opposite side of the arm. The sensor will be always on the trailing side of the arm motion. The trim-motor needs only to rotate in a single sense opposite to that of arm rotation.

The inertia of the arm 24 and the load on the drive wheel 18 have an effect on the torque reading of the sensor 50. The arm(s) and drive wheel assembly will be sufficiently massive to ensure stability of the torque signal and the rotation motion of the power output shaft.

In the application where multiple devices are driven by the windmill, a second control is desirable. The rate of rotation of the output shaft 12 is used as a control parameter. Since the processor 56 rides with the shaft, this signal can be easily picked up by the processor using a crude RPM counter. Low RPMs are suitable for air-compressor and high RPMs can be utilized for all devices. Power distribution (on or off) to each device can be controlled according to two or three bracketed ranges of RPM of the output shaft.

Although FIG. 2 has illustrated the operation for a particular direction of the prevailing wind, it will be appreciated that the mechanism is automatically responsive to any changes in wind direction to adjust to the new directions of the wind. With the improved efficiency which is obtained with the present invention, a windmill can be effective at low prevailing winds. Of course as wind velocity increases, it is possible to develop increased power output. With the flexible mast structures which have been illustrated and described, the provision is made to guard against potential damage which might otherwise occur due to sudden wind gust or high winds. Sudden wind gusts and high winds may give rise to forces of appreciable magnitude which cannot be utilized without a strong and elaborate structure of wind responsive assembly. These forces are reacted by the flexible mast structure so as to provide automatic feathering. Thus the mast and fabric structure provides a lightweight yet effective wind gathering construction which can harness energy efficiently and which is less susceptable to potential damage under sudden gusts and high wind conditions.

Figure 10:
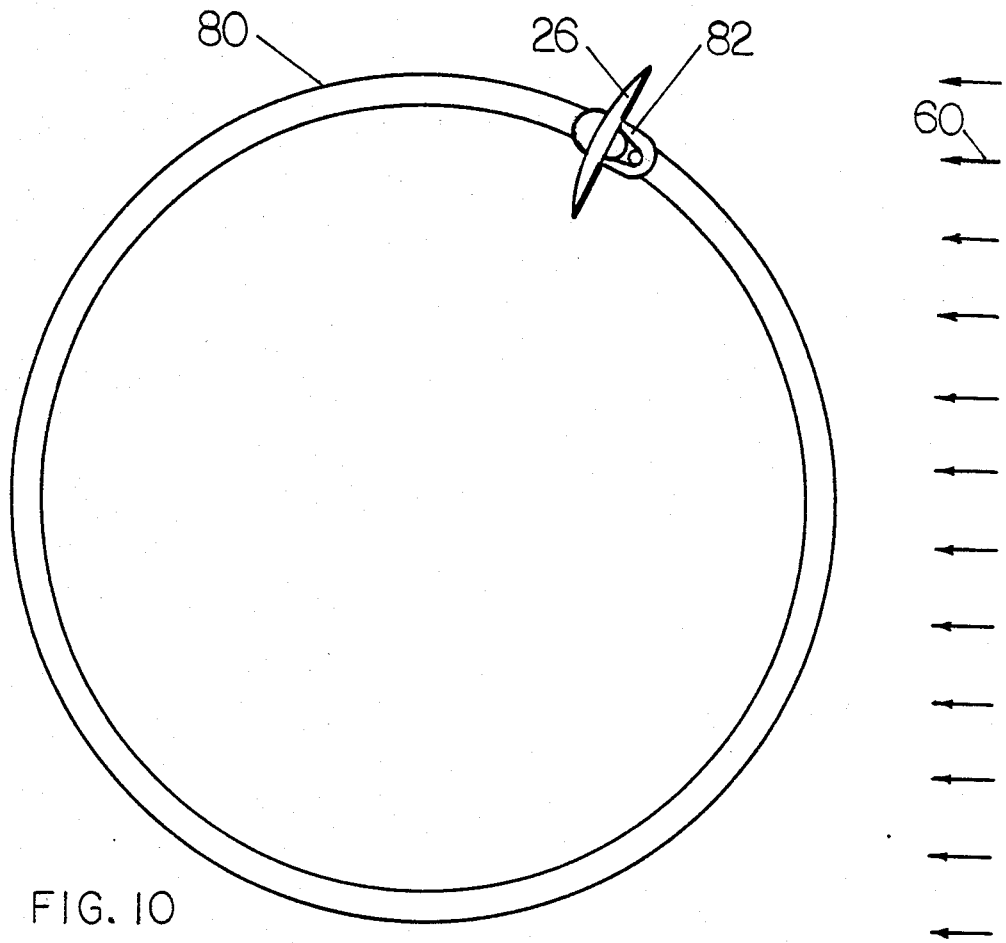
FIG. 10 is a top view of a large scale windmill embodying the same principle as that in FIG. 1 except that the sail and mast structure travels on a circular track instead of an arm.
Figure 11:
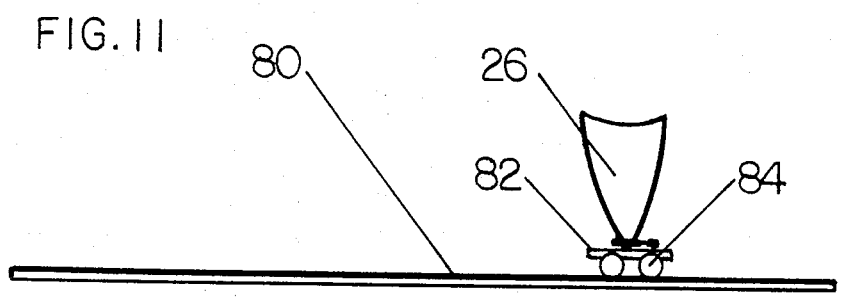
FIG. 11 is a side elevational view of FIG. 10.

While a preferred embodiment of the invention has been disclosed, it will be appreciated that principles may be applied to other embodiments. For a large application of the present invention, a circle travelled by a wind responsive assembly can be as large as one mile in diameter for some plain's farms. It then will be more practical to use a circular track 80 shown in FIG. 10 in place of arms 24. The wind responsive assembly 26 will be disposed on vehicle 82 traveling on the track 80. The ultilization devices will be driven by the wheels of the vehicle 82. In this application, the most suitable utilization device 84 is a motor-generator as those used on electrical trains. The device 84 generates electricity during the running and tacking modes of the wind responsive assembly 26 and consumes electricity as a motor to drive the vehicle through the flutter mode. The tracks serve as conductors for the electricity supplied to and produced by the device 84. This is regarded as a variation of the present invention and will not be further elaborated.

What is claimed is:

1. In a windmill comprising a power output shaft, means supporting said power output shaft for rotation about an axis, an arm projecting radially of said shaft, a wind responsive surface spaced radially of said axis and means operatively coupling said wind responsive surface with said output shaft such that in response to wind said wind responsive surface is caused to execute circular motion about said axis and deliver torque to said power output shaft, the improvement which comprises said wind responsive surface being a generally upright fabric sail having side edges, a mast structure supported on said arm and arranged in a supporting relation with said sail, said mast structure including a base and a pair of spaced apart resiliently flexible mast elements mounted on said base and supporting said side edges of said sail, said mast elements extending upwardly and diverging outwardly from said base, said mast elements being capable of flexing both leewardly and toward each other to provide automatic sail feathering in response to increased wind velocity acting upon said fabric sail.

2. The structure according to claim 1 wherein said flexible mast elements diverge outwardly in arcuate shapes, said sail being of a similar arcuate shape at its side edges and being of a concave shape at its upper edge to facilitate an automatic feathering action of said fabric sail in high wind conditions.

* * * * *